(No Model.)
J. B. RHODES.
SAW TOOTH SWAGE.
No. 382,325. Patented May 8, 1888.
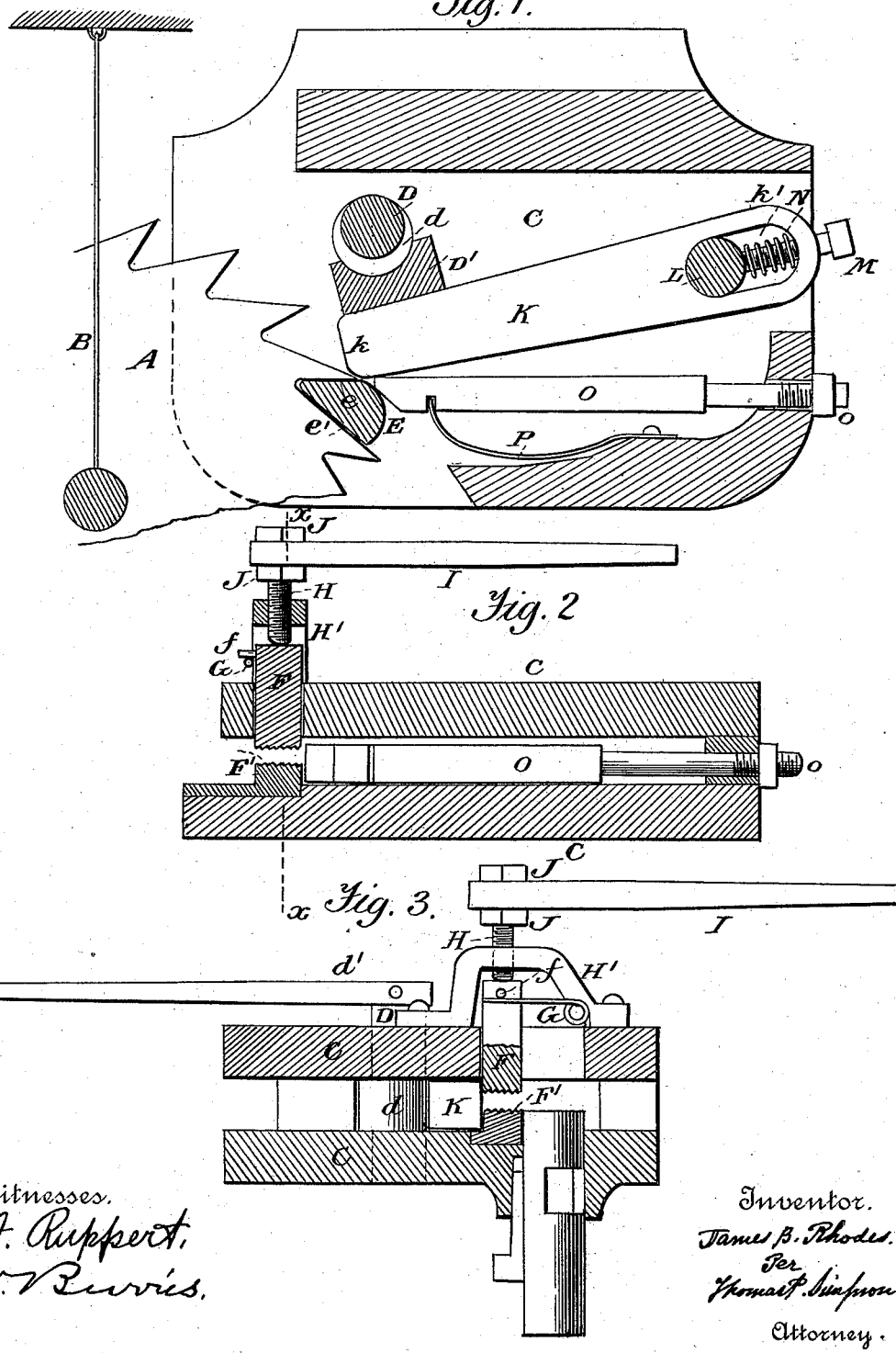
Witnesses.
A. Ruppert.
W. V. Purvis.
Inventor.
James B. Rhodes.
Per
Thomas P. Simpson.
Attorney.

UNITED STATES PATENT OFFICE.

JAMES B. RHODES, OF CHEBOYGAN, MICHIGAN.

SAW-TOOTH SWAGE.

SPECIFICATION forming part of Letters Patent No. 382,325, dated May 8, 1888.

Application filed November 18, 1887. Serial No. 255,504. (No model.)

*To all whom it may concern:*

Be it known that I, JAMES B. RHODES, a citizen of the United States, residing at Cheboygan, in the county of Cheboygan and State of Michigan, have invented certain new and useful Improvements in a Saw-Tooth Swage; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The special object of the invention is to swage the teeth of circular saws, as hereinafter fully described in connection with the drawings.

Figure 1 of the drawings is a front elevation; Fig. 2, a longitudinal vertical section, and Fig. 3 a transverse vertical section on the dotted line $x\ x$ of Fig. 2.

In the drawings, A represents a circular saw on a hanger, B, and ready for the tooth-swaging operation.

C C are two parallel boards or plates, in which is journaled the shaft D, having the cam $d$ between the boards and the handle-arm $d'$ on the outside thereof.

E is the anvil, having the flat surface $e$, on which the tooth is swaged, and the inclined surface $e'$, which bears on the long side of the previously-swaged tooth.

F is the movable jaw, having the stud $f$ and held by a spring, G, against the front end of the clamping-screw H, which works in a fixed nut in the bracket H'. The screw H is operated by a hand-lever, I, held between the jam-nuts J J. The jaw F clamps the tooth which is to be swaged against the stationary jaw F'.

K is the swage, whose front end, $k$, draws out the tooth on the anvil E, giving it the desired point and angle, the swage turning on the pivot L as a center when pressed down by the cam $d$ acting on the intermediate piece, D', which has on top a concavity to receive the cam and on the bottom a plane surface which lies flat upon the swage. The rear end of the swage K has a longitudinal slot, $k'$, and an adjusting-screw, M, by which the swage end $k$ may be thrown more or less forward. I may also use a spiral spring, N, on the screw, but this is not absolutely necessary. The front end of the swage is lifted by the tooth-stop O, which is supported on a plate-spring, P, arranged beneath it, whenever the cam $d$ has ceased to press upon the swage. The stop is adjusted by a nut, $o$, on its threaded end.

Having thus described all that is necessary to a full understanding of my invention, what I claim as new, and desire to protect by Letters Patent, is—

1. In a tooth-swage for circular saws, the combination, with the clamping-jaws F F', of an anvil, E, having the flat top face, $e$, and the inclined bottom face, $e'$, to hold the tooth while being swaged, as set forth.

2. The combination, with the anvil and clamping-jaws, of the rear pivoted swage, K, having the front end, $k$, to draw out the point of the tooth, and the spring-actuated tooth-stop under said swage, as shown and described.

3. The combination, with a frame, C, of the cammed and hand-levered shaft D, the rear pivoted swage, K, the spring tooth-stop O, the anvil E, and the jaws F F', all constructed and arranged substantially as and for the purpose specified.

4. The swage and tooth-stop provided with means, substantially as described, by which they may be correspondingly adjusted more or less forward toward the anvil, as shown and described.

In testimony whereof I affix my signature in presence of two witnesses.

JAMES B. RHODES.

Witnesses:
A. F. WATSON,
C. L. SMYTH.